United States Patent [19]

Bartenbach

[11] 4,222,091
[45] Sep. 9, 1980

[54] LIGHTING SYSTEM

[76] Inventor: Christian Bartenbach, 1, Croissant-Rust-Strasse, D-8000 München 80, Fed. Rep. of Germany

[21] Appl. No.: 897,192

[22] Filed: Apr. 17, 1978

[30] Foreign Application Priority Data

Apr. 21, 1977 [DE] Fed. Rep. of Germany ....... 2717773

[51] Int. Cl.² ............................................. F21V 7/04
[52] U.S. Cl. ................................... 362/32; 362/252; 362/806
[58] Field of Search .................. 362/32, 252, 263, 806

[56] References Cited

U.S. PATENT DOCUMENTS

| | | | |
|---|---|---|---|
| 2,316,589 | 4/1943 | Iwanowicz | 362/32 |
| 3,018,362 | 1/1962 | Joyce | 362/32 |
| 3,727,044 | 4/1973 | Monrey | 362/32 |
| 3,758,285 | 9/1973 | Knowlton | 362/32 |
| 3,767,910 | 10/1973 | Harrigan | 362/32 |
| 3,904,865 | 9/1975 | McCarthy | 362/806 X |
| 3,950,638 | 4/1976 | Kent et al. | 362/263 X |
| 4,072,857 | 2/1978 | DeVicaris | 362/252 X |
| 4,127,892 | 11/1978 | Bakalowits et al. | 362/32 |

FOREIGN PATENT DOCUMENTS 166396 7/1950 Austria ........................................ 362/32

*Primary Examiner*—Peter A. Nelson
*Attorney, Agent, or Firm*—Gilbert L. Wells; Heinrich W. Herzfeld

[57] ABSTRACT

A lighting system having a high output lamp constituting an approximately point-shaped light source and a plurality of transparent shells disposed about the high output lamp, each of which shells has a central opening, an inner rim face about the opening and an outer rim face about the periphery of the shell. At least a major portion of the light emitted by the lamp is received by the inner rim faces of the shells and is transmitted by total reflection between the opposite side walls of each of the shells to and out of the outer rim faces of the shells, from which the light emerges.

14 Claims, 4 Drawing Figures

LIGHTING SYSTEM

BACKGROUND OF THE INVENTION

The present invention relates to a lighting system which comprises a high output lamp constituting an approximately point-shaped light source, for example a metal halide lamp or a halogen incandescent lamp, and light-directing means which direct the light from the lamp.

In known lighting units of this type, the means which direct the light to a particular desired area is normally a reflector which is located on the side of the lamp facing away from the area to be illuminated.

Because of the extreme brightness of such high output lamps—for example, the output of a 250 watt metal halide lamp is 20,000 Lumen—the use of such lighting systems is restricted, for they must be located at a substantial distance from the area to be illuminated, and they must be so arranged that persons present in the illuminated area do not normally have the lighting system in their field of vision, for the reason that the extremely high luminance of such lighting systems is very unpleasant to anyone looking at the light source of the system.

With regard to the prior art, it should be pointed out that the principle of the total reflection of light for the purpose of light conduction which principle is made use of in the lighting system according to the invention, is of course known per se. For example, glass filament bundles are used to conduct light. It is also known to attach individual glass rods, in the case of lighting units for living rooms and the like, for decorative purposes, with one end pointing towards the lighting unit and the other end consequently appearing as an independently luminous point. Finally, lighting systems are also known in which a fluorescent lamp is located in a cap, from which cap a sheet of glass-like plastic extends upwards and, at its upper end, is bent downwards again, so that the light issuing from the free rim surface of the plate of glass-like plastic is projected downwards.

Totally reflecting light-conducting elements have not hitherto been employed in order to enlarge the apparently luminous surface of lighting systems comprising high output lamps, and in order to distribute the light from such a lamp over a particular determined area.

OBJECTS AND SUMMARY OF THE INVENTION

It is, therefore, an object of the invention to broaden the field of use of lighting systems comprising such high output lamps which, because of their extremely high luminance, have hitherto only been of limited applicability. More particularly, it is an object of the invention to provide a lighting system of the type initially described wherein the light flux emanating from the lighting system is distributed over a relatively large, apparently luminous surface, whereby the dazzling effect of the light source can be substantially reduced. In doing so, the losses which can naturally never be completely avoided should be kept low in spite of the high degree of efficiency of high output lamps.

According to the invention, these objects are attained, in a lighting system of the initially described type, by the improvement of the said light-directing means comprising a plurality of transparent shells disposed about the high output lamp, each of which shells has a central opening, an inner rim face about the said opening and an outer rim face about the periphery of the shell, at least a major portion of the light emitted by the said lamp being received by the inner rim faces of the shells and being transmitted by total reflection between the opposite side walls of each of the shells to and out of the said outer rim faces of the shells, from which the light emerges.

The annular shells can consist, for example, of a highly transparent acrylic glass. Preferably, however, they consist of optical glass of highest attainable light transmission, of the kind used, for example, for spectacle lenses or camera objectives.

In the lighting system according to the invention, as a rule, virtually all the light emitted by the lamp is collected by the inner rim surfaces of the transparent annular shells and is passed, by total reflection at the main surfaces (bordering on air), to the outer rim faces of the annular shells which faces are thereby made to appear light-radiating. The total outer rim faces are large compared to the luminous surface of the lamp, so that the apparently luminous surface is very greatly increased in the lighting system of the invention. Lighting systems according to the invention also do not interfere optically with the appearance of a room in which they are used, since, when the system is viewed from the side, the light source itself is rendered more or less invisible.

The inner rim or terminal faces of the annular shells preferably extend substantially at right angle to the adjoining inner and/or outer sides of the shell and substantially perpendicular to the direction of the light incident on such rim faces. This means that the inner rim face of each annular shell should at all points be at least approximately at right angle to a radius extending from a light source (which corresponds approximately to a point source) to the inner rim face. The two totally reflecting longitudinal shell surfaces which surfaces adjoin the inner rim face and extend from the latter to the outer rim or terminal face of the particular annular shell should, in their zone adjoining the inner rim face, extend at least approximately parallel to the aforesaid radius. Since, in practice, it is advantageous to select annular shells which are not excessively thick, the above condition can be fulfilled without difficulty. As a rule, the annular shells will be from about 3 to 6 mm thick, even though narrower or thicker shells may be used in certain cases depending on the size and construction of the lighting system.

The inner rim faces of the annular shells can to some extent deviate from the above-mentioned preferred arrangement. However, it is essential that if the main surface on one side of a shell, e.g. its outer side refracts the light incident thereon from the inner rim face, it should refract the light in a direction such that it impinges on the surface on the opposite, e.g. the inner side of the annular shell at an angle which is still so small that the light is subject to practically total reflection.

Accordingly, the inner rim faces of the annular shells are preferably located in contact with each other to constitute, at least approximately, a zone of a rotational body, advantageously of a spherical surface which surrounds the center point of the light source in the lamp. Here again, deviations are of course possible. Thus, the inner rim faces of the annular shells are, for manufacturing reasons, advantageously parts of the enveloping surfaces of a cone, since such surfaces can be ground and polished relatively easily.

In order that the configuration of the individual annular shell (viewed in axial planes extending through the common central axis of the lighting unit and of the shells), in the region near its inner rim face, coincides at least approximately with the direction in which the light, coming from the light source which has a certain finite dimension, is incident in the inner rim face, the latter face should be at a distance from the light source in the lamp which is at least equal to one and up to three times the dimension of the light source in the axial direction.

As a rule, it is preferred that the annular shells should be of at least approximately constant thickness. This facilitates their design. However, some deviations are also possible. A gradual reduction in thickness from the inner rim face to the outer rim face should, as a rule, be avoided as it restricts the possibilities of total reflection, whilst an increase in thickness in the outward direction assists total reflection. In order to increase the apparently luminous outer terminal face of a shell, the thickness of the annular shell can be increased in the region near the outer rim face so that the profile of the annular shell expands in that region, e.g. approximately in a trumpet-like manner. This does not substantially increase the amount of material required to make the annular shell, nor the weight of the lighting unit, while the apparently luminous surface can be increased considerably in this way. Furthermore, this arrangement makes it possible to distribute the light, emitted by the particular annular shell, over a larger area.

In a particularly simple embodiment of the lighting system according to the invention, the other rim faces of the annular shells extend substantially vertically to the adjoining regions of the shells. In that case, the mean direction of light radiation to the apparently luminous outer rim face of each annular shell coincides everywhere with the central axis perpendicular to this surface. If, however, the outer rim face of the annular shell is inclined away from the aforesaid mean direction of light radiation, the main direction of radiation of the outer rim face can be thus deviated. Moreover, the apparently luminous outer rim face will thereby appear larger.

In order to achieve special lighting effects, the outer rim faces of the annular shells can also be profiled in a manner suitable to attain the desired effect.

Preferably, the annular shells are constructed, and arranged, in rotationally symmetrical configurations about the lamp. In that case, the outer rim faces of the annular shells are, in their preferred embodiment, conically beveled annular rim faces. The outer rim faces can, however, also possess a concave or convex curvature, so that their section in a plane extending through the longitudinal axis of the lamp is a concave or convex curve. This feature can be also used to vary the direction of light emission and the distribution of the light over a larger or smaller area.

The annular shells need not necessarily be, or need not be throughout, of rotationally symmetrical configuration. For example, to distribute the light over rectangular areas, the annular shells can be of such shape that whilst their inner rim faces are true partial conical enveloping rim faces, the outer rim faces may extend substantially along rectangles, in particular along squares. In that case the annular shells are, for example, in the shape of a cloister dome or pyramidal surface with preferably rounded corners and/or edges. However, such shapes are relatively expensive to manufacture.

As a rule, the annular shells will be vaulted in a cup-like manner, so that the annular shells which are furthest forward, in the principal direction of emission of light from the system, have approximately the shape of cups having an open bottom and with a relatively steep wall near the outer, peripheral rim, whilst the middle annular shells have approximately the shape of bowls with openings in their bottoms, and the annular shells which are set back furthest with regard to the principal direction of light emission extend, in axial section, initially away from the principal emission direction and only curve in towards this direction in their more outwardly-located parts, e.g. in a mushroom head-like configuration. Frustoconical configurations are also possible, though a vaulted dish- or cup-shape is as a rule preferred. It will be appreciated that, viewed in axial section, the annular shells must not be more strongly curved than is required for attaining the desired total reflection at both the inner and the outer main surface of the annular shell. The thinner the annular shell, the more it can also be curved, and still attain this end.

While unsymmetrical shells are also possible, these will only be selected if the considerable technical effort required by their manufacture is justified by a special application.

In order to achieve optimum quality of the lighting systems according to the invention, the outer and inner rim faces, and the two main surfaces, of each annular shell can be given optimum configuration, and be provided with optimal optical properties, by grinding and polishing. In the case of lighting units for less stringent demands it will usually be sufficient to manufacture both the inner and the outer main surfaces of the annular shells by a synthetic plastics molding techniques. However, even then it is advisable to finish the rim faces by machining, for example by grinding.

In the lighting systems according to the present invention, it is, in principle, possible to use an arc lamp as high output lamp; however, it is preferred that the high output lamp used therein is one, the light of which is generated in a sealed glass bulb.

BRIEF DESCRIPTION OF THE DRAWINGS

The invention is explained in more detail below in connection with a number of embodiments, as shown in the accompanying drawings.

DETAILED DESCRIPTION OF THE EMBODIMENTS SHOWN IN THE DRAWINGS

Figure 1:
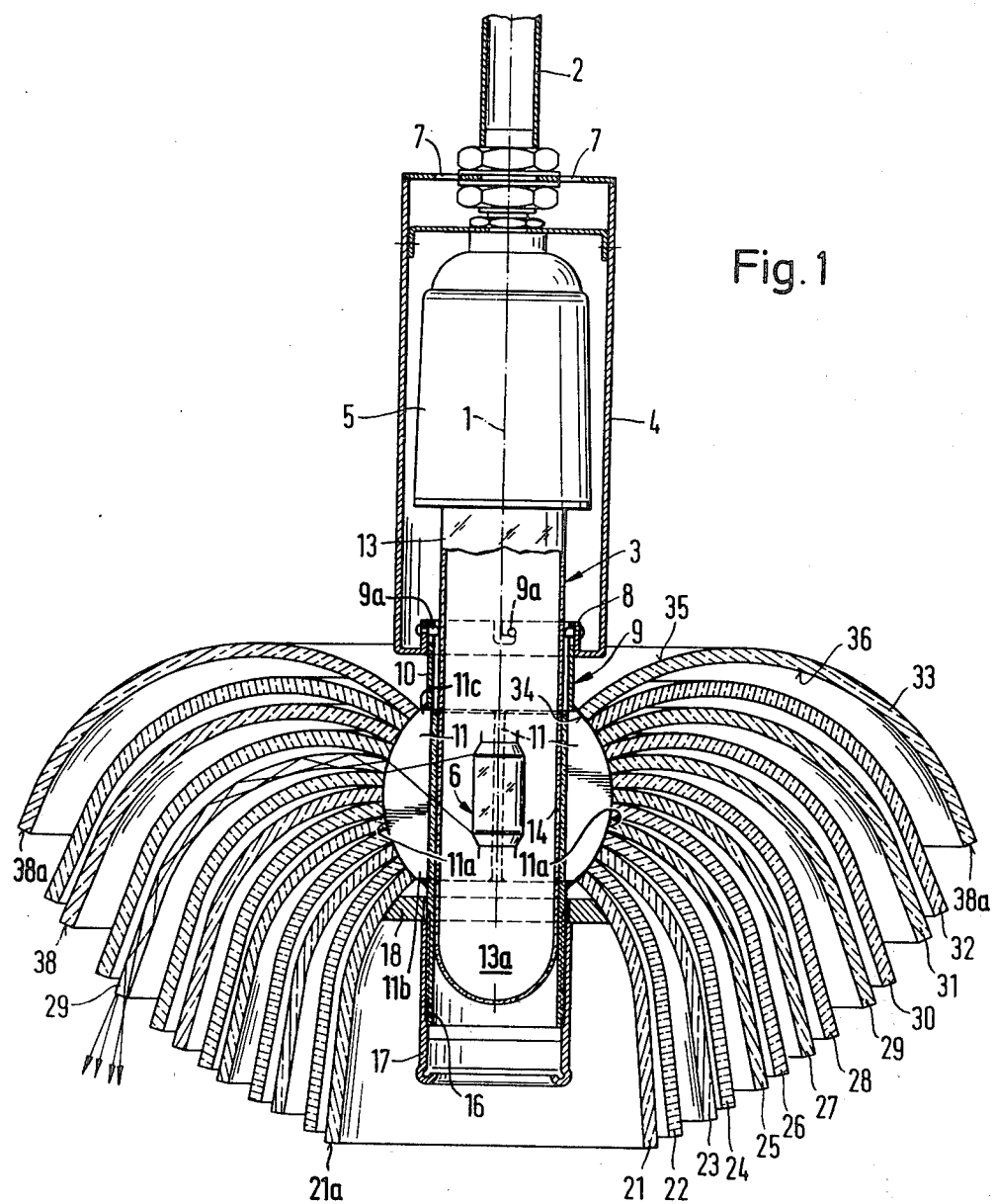
FIG. 1 shows an axial partially sectional view of a preferred embodiment of a suspended lighting unit according to the invention.

The lighting system shown in FIG. 1 is intended for the illumination of enclosed spaces, although lighting units according to the invention can also be used with advantage in the open, for example for illuminating roads, football fields and the like areas.

The lighting unit is of rotationally symmetrical construction relative to its longitudinal axis 1 which is in vertical position if the unit is suspended from the ceiling. However, the unit can also be employed with the axis inclined at any angle to the vertical.

The lighting unit is carried by a tubular suspensing rod 2, which accommodates a high voltage cable for supplying the current to a lamp 3. At the lower end of the suspending rod 2 a cylindrical casing sleeve 4, which is preferably made of metal, is affixed in a conventional manner to rod 2 concentrically therewith by means of appropriate threaded nuts. In addition, a lamp socket 5 for the lamp 3 is attached in a conventional manner at the lower end of the suspending rod 2; in the particular embodiment illustrated in FIG. 1, this lamp can be a 250 watt mercury high pressure lamp as supplied, for example, by OSRAM AG, Berlin, Germany. The luminous part of the light source of the lamp 3 is of approximately cylindrical shape and is indicated by reference numeral 6. This light source 6, which is of generally cylindrical shape, is the approximately point-shaped light source required in the lighting system for the purposes of the invention.

The casing sleeve 4 has venting bores 7 at its top end wall, whilst at its bottom wall it possesses a cylindrical seat 8 in which a glass shell carrier 9 is suspended by means of four bayonet catches 9a, in the manner shown in the drawing. The glass shell carrier 9 comprises an upper open-ended sheetmetal cylinder 10 and four carrier plates 11 the upper ends 11c of which are welded to the rim at the lower open end of cylinder 10. The carrier plates are uniformly distributed about the periphery of cylinder 10 and lie in planes which pass through the central axis 1 of the system. The carrier plates 11 consist of metal and have the contours of a segment of a circle, with the corners cut off. They are arranged in such a manner that the curved outer rims 11a of the carrier plates 11, which face away from the axis 1, lie in the surface of a hypothetical sphere which is concentric with the center of the light source 6 in the lamp 3. Inside the carrier plate 11, there extends a glass cylinder 14, the upper end of which surrounds the bulb 13 of the lamp 3. This cylinder 14 is made of a glass which absorbs the main portion of the infrared component of the light generated in the lamp 3. The cylinder 14 is seated with its lower rim on the upper rim 16a of a metal cylinder 16 which surrounds the lower part 13a of bulb 13 of the lamp 3 and which is welded onto the lower ends 11b of the four carrier plates 11. On its outside, the metal cylinder 16 is provided with a fine threading onto which is screwed a further metal cylinder 17 to the top of which is fastened a supporting ring 18 which is also made of metal. This supporting ring 18 supports the seven lower glass shells 21 to 27 whilst the six upper glass shells 28 to 33 rest by their inner rim faces 34 on the curved outer rims 11a, forming part of the above-mentioned spherical surface, of the four carrier plates 11. The level of the carrier ring 18 can be adjusted very accurately by appropriately turning the cylinder 17, which possesses an internal threading, upward so that the lower seven glass shells 21 to 27 come to rest with their inner rim faces securely against the curved outer rims 11a of the carrier plates 11. Since the carrier plates 11 are devised to achieve precise centering, their outer rims 11a are finished by grinding, so that they precisely form part of the hypothetical sphere, the center of which is identical with the center of the light source 6; in the preferred embodiment, shown in FIG. 1, this sphere has a diameter of 80 mm.

The inner rim faces 34 of the annular shells 21 to 33, which shells consist of optical glass, each form parts of conical surfaces enveloping the last-mentioned sphere, but because of the small thickness of the annular shells the total surface covered by them approximates sufficiently to the surface of the above-mentioned sphere; consequently, the four carrier plates 11 hold the annular shells 21 to 38 accurately centered around the light source 6. At the same time, the two circular edges at the upper and the lower ends of the inner rim face 34 of a given annular shell in each case abut the corresponding edges of the rim faces 34 of the two adjacent annular shells, one above and the other below the first-mentioned given shell, whereby, virtually all the light emitted by the light source 6 is collected by the assembly of the inner rim faces 34 of all of the annular shells 21 to 33. The small amount of light which passes from the light source 6 to the circular area enclosed by the upper edge of the inner rim face 34 of the uppermost annular shell 33 and to the circular area enclosed by the lower edge of the inner rim face 34 of the lowermost annular shell 21 is negligible since, with the type of lamp preferably used in this lighting system, only the surface of the jacket 6a of the cylindrical light source 6 is luminous. If there is used instead a lamp having a light source which is uniformly luminous in all directions, the top and bottom areas not covered by the inner rim faces 34 of the annular shells must be kept as small as possible.

It will be seen that the light emitted from the cylindrical jacket of the light source 6 is incident onto each of the inner rim faces 34 in such a way that the direction of incidence of the light encloses only a very small angle with the two main surfaces 35 and 36 of which the former is the top or outer surface and the latter is the lower or inner surface of the corresponding annular shell and which surfaces form the upper and the lower edge, respectively, at the particular inner rim face 34. As a result, this light is in each case totally reflected as the two main surfaces 35 and 36 of the respective annular shell, until it is re-emitted from the shell through the outer rim face 38 of the latter. To make this possible, the distance of the inner rim faces 34 from the light source 6 must be the greater, the larger the light source itself.

In the portion of the glass shell 29 shown on the left-hand side of FIG. 1 there have been indicated the light rays which are emitted respectively from the top and bottom zone of the light source 6 and enter through the inner rim face 34 of shell 29. FIG. 1 shows how these rays are deflected downwards through the vaulted shape of the shell 29, until they leave this shell in the desired downward direction. In addition, the two outermost rays of the light cone leaving the shell 29 have been indicated by outwardly deflected arrows in FIG. 1.

In the embodiment shown in FIG. 1, the light rays leave the outer rim faces 21a to 38a, of each shell in a relatively steep downward direction, whereby a person working in the room but not looking directly into the lighting system from below, will not be dazzled or blinded by this light.

By varying the degree of curvature of the individual annular shells it is possible to allow the light being emitted downward to do so at any desired angle.

It will furthermore be appreciated, from the above-described embodiment, that the direction and distribution of the light leaving each shell can be substantially influenced by giving an appropriate shape to the outer rim face 38 of the shell.

Figure 2:
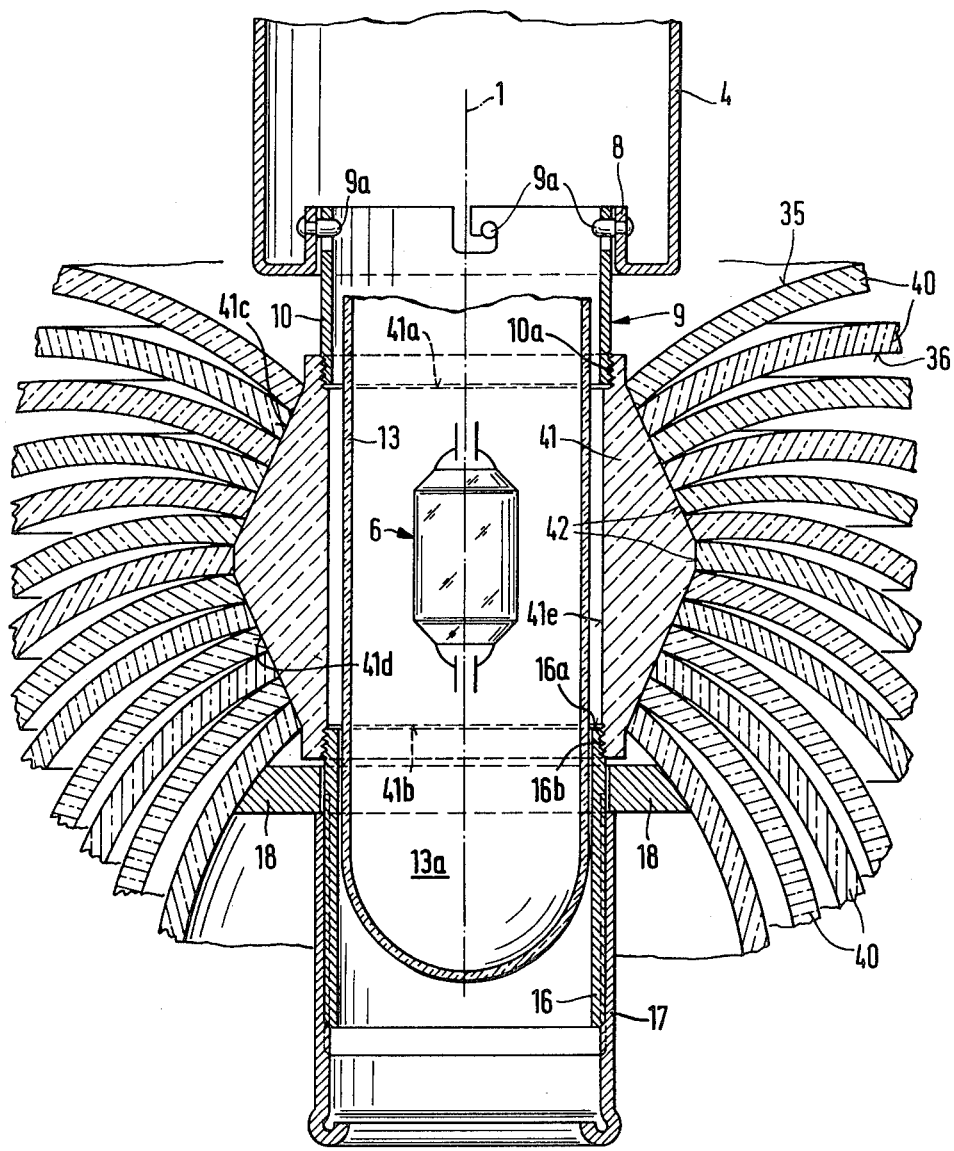
FIG. 2 shows schematically, again in axial partially sectional view, a modified embodiment of the lighting unit shown in FIG. 1.

FIG. 2 shows in partial view a somewhat modified embodiment of the novel lighting system. In the system shown in FIG. 2, the separate carrier plates for carrying and orienting the annular shells 40 arranged around the light source 6 of the lamp 3 have been replaced by an annular carrier element, serving for centering the shells. This carrier is a highly transparent glass cylinder 41, of which the outer surface, which carries the annular shells 40, is formed as a double frustocone the smaller frustoconical end faces of which are the end face 41a and 41b of the cylinder 41. The inner cylindrical wall 41e bears threadings by means of which it engages at its upper end a threading 10a on the outside of the lower end wall of metal cylinder 10 and at its lower end a threading 16b on the outside of the upper end of metal cylinder 16. Cylinder 14 is omitted. Centering of shells 40 is effected on the conically tapered surfaces 41c and 41d, which are rotationally symmetrical relative to the central axis 1 of the system. Correspondingly, the inner rim faces 42 of the annular shells 40 are not precisely at right angles to the line connecting their centers with the center of the light source 6. This slight deviation from a right angle can, however, be tolerated.

Figure 3:
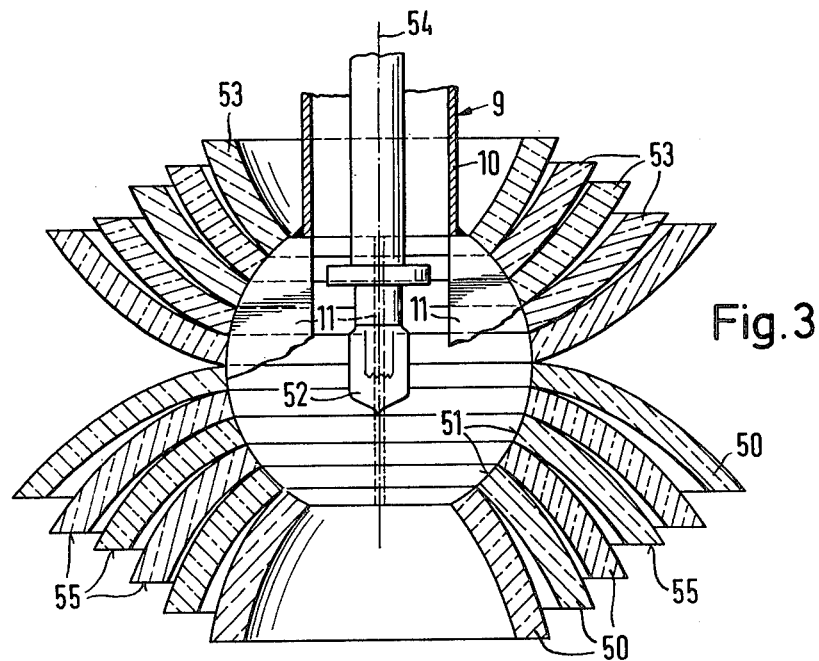
FIG. 3 shows, on a substantially smaller scale, and in a highly schematical view, a further embodiment of the lighting unit according to the invention.
Figure 4:
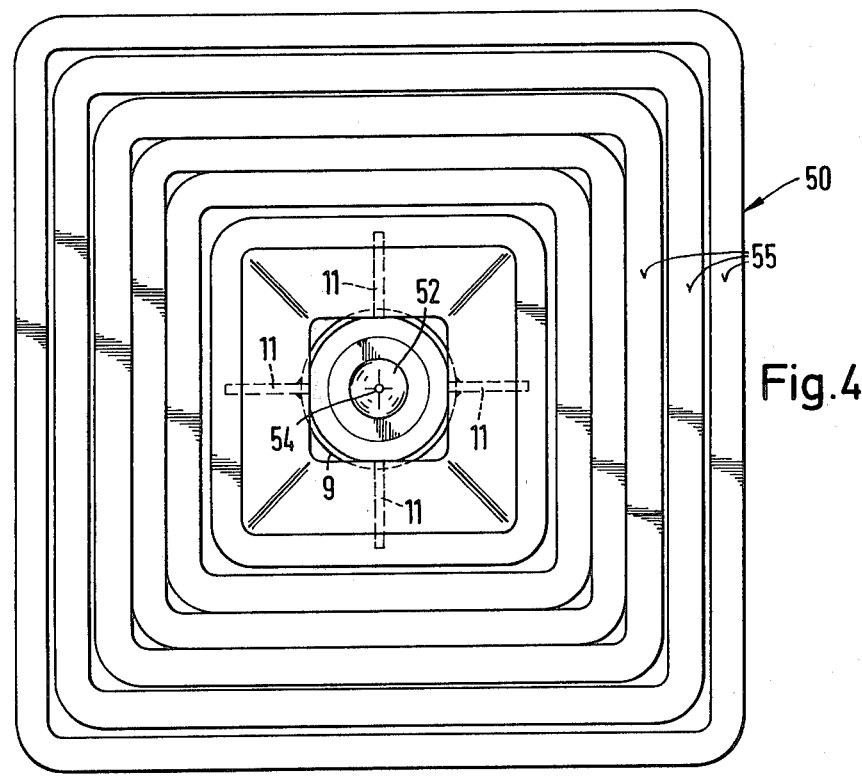
FIG. 4 shows a view onto FIG. 3 from below.

The lighting systems shown in FIGS. 3 and 4 are of a type wherein only the lower six annular shells 50 project the light which is emitted by the light source 52 and received by their inner rim faces 51, in a downward direction, whilst the upper five annular shells 53 project the light transmitted by them upwards against the ceiling of a room illuminated by this system, or against a reflector of the like device (not shown).

Furthermore, in the case of the six lower annular shells 50 shown in FIG. 3, the outer rim faces 55 through which the light is emitted are not at right angles to the two main surfaces of each particular annular shell. Instead, the outer rim faces 55 extend in planes which are perpendicular to the central axis 54 of the lighting system. In this way, the light emitted by shells 50 is more specifically projected downwards, the apparent luminous surface and scattering of the light are increased.

Finally, the lighting system according to the invention may also have the outer rim faces of the individual annular shells designed to exhibit a rectangular, preferably a square configuration. In this case, each annular shell is approximately in the shape of a cloister dome with rounded edges. Such a shape is particularly appropriate if the lighting system is to illuminate a rectangular area.

I claim:

1. A lighting system comprising a high input lamp constituting an approximately point-shaped light source and light-directing means which direct the light from the lamp to a determined area to be illuminated, said light-directing means comprising a plurality of transparent shells disposed about said high output lamp, each of said shells having a central opening, an inner rim face about said opening and an outer rim face about the periphery of said shell, said inner faces having edges in contact with one another, said edges defining a rotational body about said light source, at least a major portion of the light emitted by said lamp being received by the inner rim faces of said shells and being transmitted by total reflection between the opposite side walls of each of said shells to and out of said outer rim faces of said shells.

2. The system of claim 1, wherein said inner rim faces are substantially at right angle to the adjacent inner and outer sides of said shells and substantially perpendicular to the direction of light from said high output lamp incident on said inner rim faces.

3. The system of claim 1, wherein said outer rim faces are substantially at right angle to the adjacent inner and outer sides of said shells.

4. The system of claim 1, wherein said shells are of at least substantially constant thickness.

5. The system of claim 1, wherein said shells are disposed about said lamp coaxially therewith and are of rotationally symmetric shape.

6. The system of claim 1, wherein said shells are of vaulted cup- or bowl-shaped configuration.

7. The system of claim 1, wherein said shells are superimposed one above the other and their peripheries are of different diameters increasing from a minimum diameter to a maximum diameter, shells of small diameter being placed with their outer, convex side into the inner, concave side of the shell of next larger diameter.

8. The system of claim 7, wherein the aforesaid convex and concave side walls of a smaller-diameter shell and the next-larger-diameter shell are in contact with one another in the region of their inner rim faces and spaced from one another over the remainder of their inner and outer sides.

9. The system of claim 1, wherein said high output lamp is a metal halide lamp or a halogen incandescent lamp.

10. The system of claim 1, wherein said rotational body is a sphere, the center of which is at least substantially at the center of said light source.

11. The system of claim 1, wherein said rotational body is cylindrical, the outer sidewall surface of said body being that of a double frustocone with the smaller frustoconical end faces being the end faces of said cylindrical body.

12. The system of claim 8, wherein said shells are of vaulted configuration, the shell whose periphery has the smallest diameter being substantially bell- or cup-shaped and the shell whose periphery has the largest diameter being substantially mushroom head-shaped.

13. The system of claim 7, wherein the periphery of each of said shells is of polygonal configuration.

14. The system of claim 7, wherein the periphery of each of said shells is of square configuration.

* * * * *